US006593942B1

(12) United States Patent
Bushmitch et al.

(10) Patent No.: US 6,593,942 B1
(45) Date of Patent: Jul. 15, 2003

(54) EVENT PROGRAMMING GUIDE

(75) Inventors: Dennis Bushmitch, Somerset, NJ (US); Robert S. Fish, Gillette, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/539,564

(22) Filed: Mar. 31, 2000

(51) Int. Cl.$^7$ .............................. G09G 5/00; G06F 3/00
(52) U.S. Cl. ...................... 345/721; 345/963; 345/848; 345/839; 725/39; 725/45
(58) Field of Search ................. 345/848, 852, 345/963, 839, 720, 721; 705/8, 9; 725/39, 45, 46

(56) References Cited

U.S. PATENT DOCUMENTS

| | | | | |
|---|---|---|---|---|
| 5,428,736 A | * | 6/1995 | Kahl et al. ................. | 345/798 |
| 5,528,745 A | * | 6/1996 | King et al. ................. | 345/753 |
| 5,621,906 A | * | 4/1997 | O'Neill et al. .............. | 345/839 |
| 5,855,006 A | * | 12/1998 | Huemoeller et al. .......... | 705/9 |
| 6,034,683 A | * | 3/2000 | Mansour et al. ............ | 345/764 |
| 6,202,209 B1 | * | 3/2001 | Bartholomew et al. ..... | 375/220 |
| 6,232,970 B1 | * | 5/2001 | Bodnar et al. .............. | 345/708 |

* cited by examiner

Primary Examiner—Kristine Kincaid
Assistant Examiner—Thanh Vu
(74) Attorney, Agent, or Firm—Harness, Dickey & Pierce, PLC

(57) ABSTRACT

An event programming guide for scheduling and retrieving items on a video display. The event programming guide includes a virtual analog clock interface disposed on the video display. The event programming guide includes a display interface medium that facilitates activation of an item selection feature for manipulating the items of interest on the video display for scheduling/retrieving and further programming.

31 Claims, 2 Drawing Sheets

EVENT PROGRAMMING GUIDE

TECHNICAL FIELD

This invention relates to an event programming guide, and more particularly to an event programming guide for scheduling and retrieving items on a video display including a virtual analog clock interface disposed on the video display and using an item selection feature to access the item.

BACKGROUND OF THE INVENTION

The use of the computer in scheduling events and activities has increased in recent years. The downsizing of the computer from the conventional desk top models to such models as hand-held has proliferated the use of the computer in event programming. Numerous software programs and techniques exist as an item selection using a computer feature to select an event for programming, moving cursor, pen-based, a touch ball, and even a mouse. Even computer touch screen display technology has been used in scheduling and retrieving items as an event programming technique. In spite of the teachings of the aforementioned, there is still a significant need for an event programming technique with fast accessibility and high quality in scheduling and retrieving of the event items to promote effective time management.

The majority of timer interfaces that are used for event programming and scheduling are mentally and aesthetically cumbersome and lack the quality for accessibility of time events management that an everyday user now requires. It is needed to combine the ease of time of programming with an intuitive fast approach on a user friendly programming interface.

It is therefore a principle object of the present invention to provide an event programming guide for scheduling and retrieving items on a video display. The video display will include a virtual analog clock interface that will be used to access the events for scheduling and retrieving.

It is still another object of the present invention to provide an event programming guide with improved event scheduling and retrieving accessibility for decreasing the time required in scheduling. This will improve the overall quality in the technique used for scheduling/retrieving an event for programming.

It is yet another object of the present invention to provide an event programming guide that will immediately appraise the user of his attempted entry and provide aesthetically pleasing multiple event schedules when requested.

Other objects and advantages will become apparent upon consideration of the following detailed description when taken in conjunction with the drawings.

SUMMARY OF THE INVENTION

The present invention relates to an event programming guide for scheduling and retrieving items on a video display including a virtual analog clock interface disposed on the video display and using an item selection feature for scheduling and retrieving the items. The event programming guide comprises a virtual analog clock interface disposed on a video display. A window display is disposed on the video display and interposed with the virtual analog interface thus comprising a catalog of the items for scheduling and retrieving. A display interface medium facilitates activation of the item selection feature and includes both "drag/drop" and "poke" techniques for manipulating the items on the video display.

In a preferred embodiment of the invention, the apparatus of the present invention comprises a video display including an analog clock interface having a clock face with associated hour and minute hands. The hour and minute hands are used to display current time and assistance in scheduling/retrieving the items of interest. The video display has touch screen technology as the item selection feature for invoking selection of the event of interest. The item of interest is tapped on the screen, dragged to a predetermined location, and dropped at that location corresponding to the selected event time. Fine-tuning of an event time may be facilitated by using a drag/drop technique with the hour and minute hands of the clock face. The coloring/width or some other attribute of the item of interest of the clock face, such as intermittent lines, may represent the duration of the items in time. Poking at a particular item on the video display will depict its event history such as time, occurrence, and frequency.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
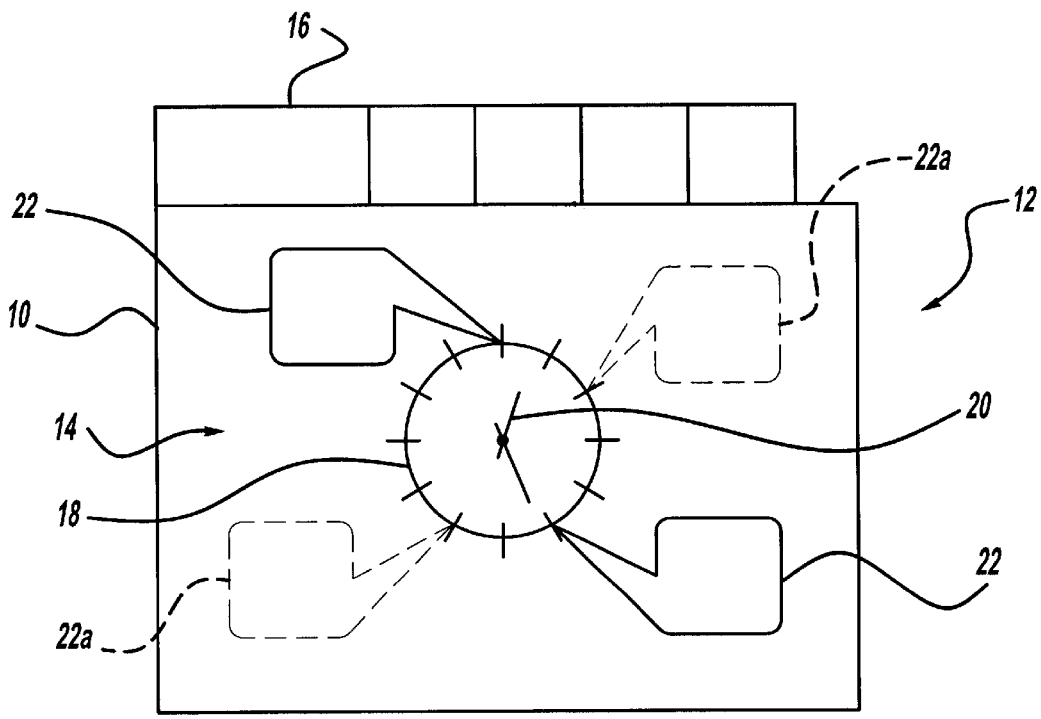
FIG. 1 is a perspective drawing of an event programming guide in accordance with a preferred embodiment of the present invention.

In FIG. 1 an event programming guide 10 for scheduling and retrieving items is shown on a video display 12. A virtual analog clock interface 14 is disposed on the video display 12. The virtual analog clock interface 14 includes a virtual clock face 18 with associated hour and minute hands 20 disposed on the video display 12. A window display 16 is disposed on the video display 12 and is interposed with the virtual analog clock interface 14. The window display 16 comprises a catalog of items 22 which are used for scheduling and retrieving in the programming sequence. The window display 16 is designed to display a "rolling index" of programs of interest such as news, comedy, sports that are predetermined by a user. The user will select or "tab" the program of interest in the window display 16 and the event items 22 will be displayed on the video display 12. A display interface medium (not shown) facilitates activation of an item selection feature (not shown). The display interface medium includes both "drag/drop" and "poke" techniques for manipulating the items 22 on the video display 12. The item selection feature comprises various techniques for accessing the items 22 for programming such as touch screen technology, a moving cursor, pen-based technology, touch-ball technology, and a mouse technology.

Tapping on the window display 16, on the video display 12 will allow a user to select an item 22 for programming. The clock face 18 will display the current time. The item of interest 22 to be programmed by the user was determined from the user profile or simply predetermined from currently available programs. The items 22 are presented as a set of graphic objects, such as rectangles or squares as viewed on the video display 12. The position of each item 22 with respect to the clock face 18 indicates the time of the selected item's availability for viewing. A coloring, width, or some other attribute of the item 22, or even the clock face 18 can represent the duration of the item in time. By tapping on the item 22 of interest, the user is taken directly to the presentation of the selected program for that item 22. If the user desires to change the time of the item 22, the user may simply tap the item 22 and drag the item 22 to the desired location on the clock face 18. The now revised item time may be viewed on the clock face 18 as shown in FIG. 1 as item 22A. Tapping, or "poking" a selected item 22 will indicate its' respective time characteristics. A user may designate other functions of a particular item 22, such as recording, time shifting, and other secondary functions by double-tapping on the item 22. This allows the user to program a time shifting/recording operation. By using the aforementioned "drag/drop" technique and the associated "poking" technique of touch screen technology, the item selection feature schedules the recording and presentation of the item 22 accordingly. It is also possible to arrange the layout of the window display 16 in such a manner to assist a user in a choice of the relevant time with respect to the items chosen according to the user's profile, availability, and other options. The window display 16 may also be used to advance and roll back the time axis.

Figure 2:
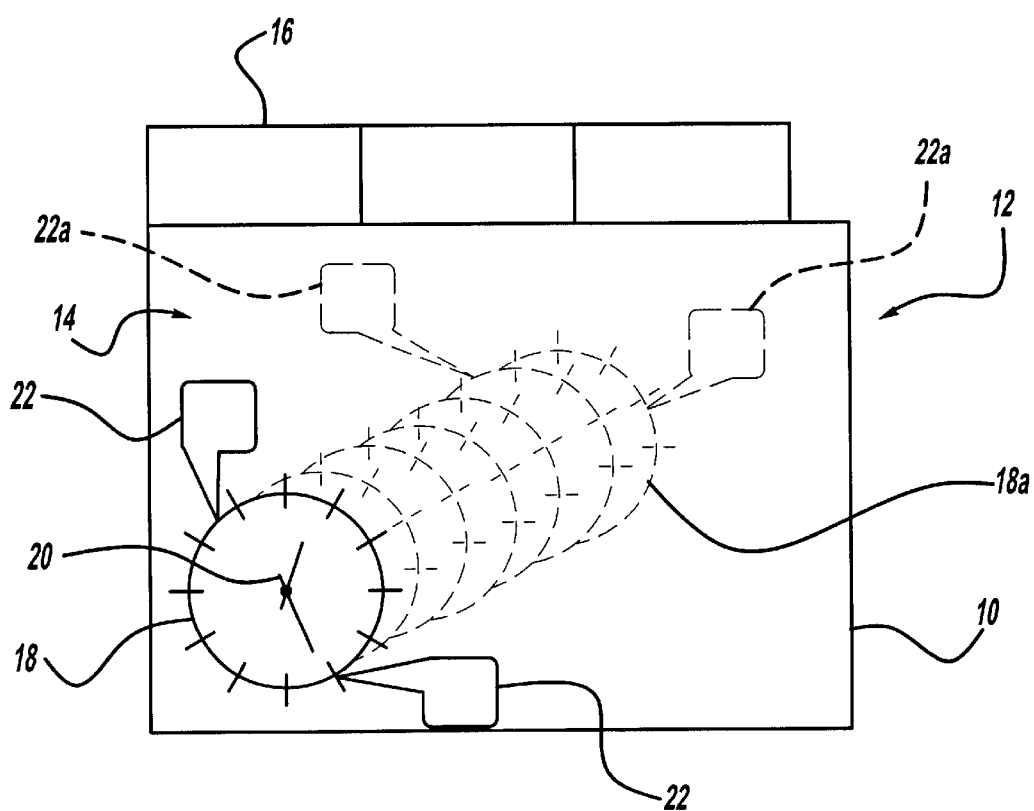
FIG. 2 is a perspective drawing of a three dimensional layout of an event programming guide in accordance with a preferred embodiment of the present invention.

Referring to FIG. 2, the event programming guide 10 is viewed in a three dimensional screen layout. The current time is viewed on the clock face 18 and the successive clock faces 18A indicate other scheduled items 22 with respect to time. An item 22 may be selected by the item selection feature on the clock face 18 and dragged to a different time frame on a "future" clock face 18A. The item 22A with a revised time, is viewed on a successive clock face 18A to designate a future time. Here again, coloring, width, or some other attribute of the item 22A or the clock face 18A can represent a duration, and future time representation of the selected item 22. The item selection feature may also select the clock hands 20 and reprogram the time of a selected item 22 by revolving around the clock face 18 and "dropping" the item 22 at the desired time.

Figure 3:
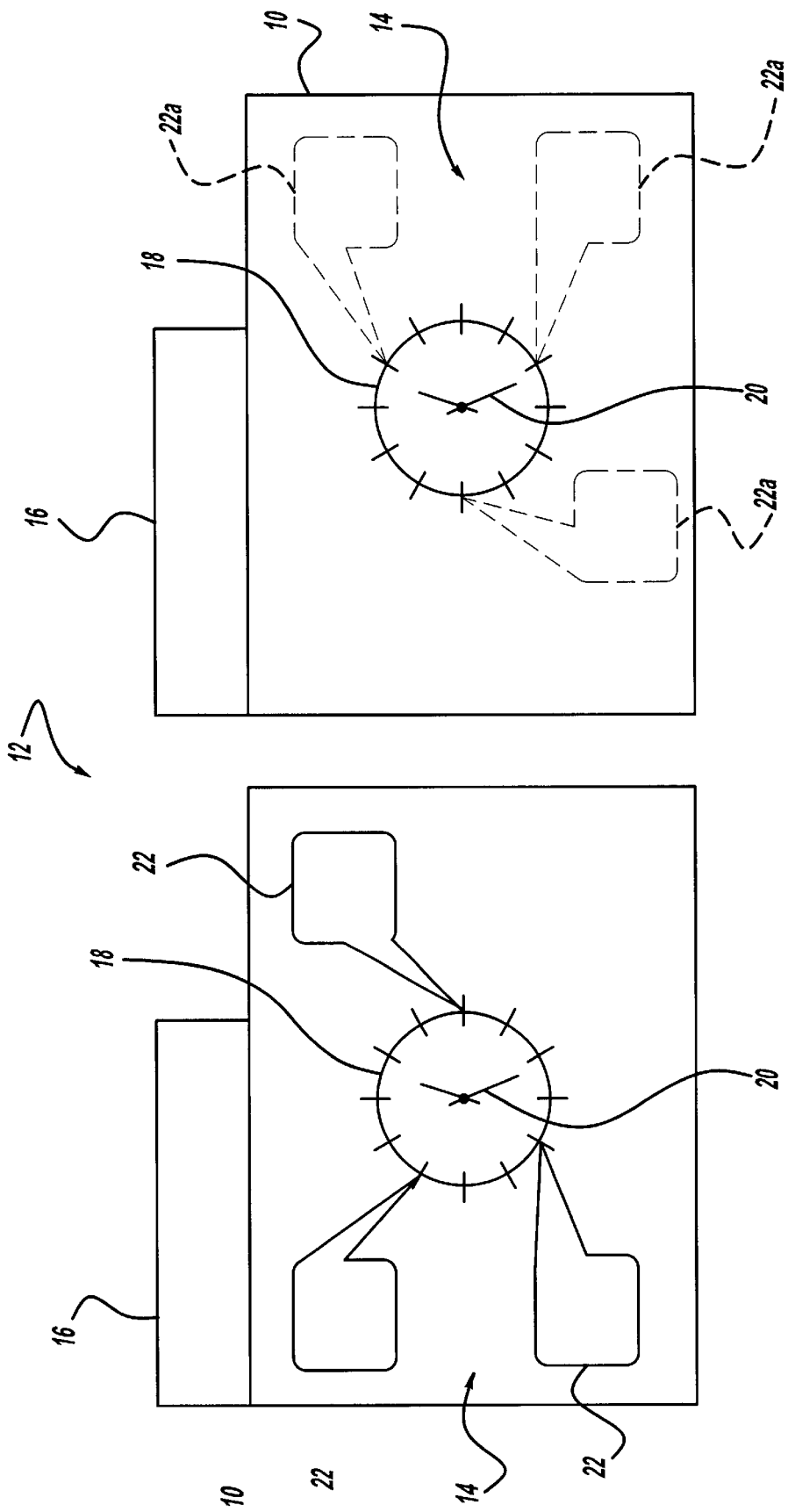
FIG. 3 is a perspective drawing of a split screen layout of an event programming guide in accordance with a preferred embodiment of the present invention.

Referring to FIG. 3, the event programming guide 10 is depicted in a split screen layout. The items 22 with their present times are viewed on the clock face 18. The programmed items 22A after being selected and manipulated by an item selection feature, can be viewed simultaneously with their predecessors. This layout facilitates a "drag/drop" and "poke" manipulation technique between screens while simultaneously viewing both pre and post scheduling times for a time shifting operation. The split-screen layout is well suited for scheduling event presentation times that are different from their respective program delivery times.

In conclusion, the present invention, is an event programming guide for scheduling and retrieving items on a video display including a virtual analog clock interface disposed on the video display, and using an item selection feature. The event programming guide includes a virtual analog clock interface disposed on the video display. It further includes a window display disposed on the video display and interposed with the virtual analog clock interface, including a catalog of the items for scheduling/retrieving. It still further includes a display interface medium that facilitates activation of the item selection feature, comprising both "drag/drop" and "poke" techniques for manipulating the items on the video display.

According to one embodiment, the virtual analog clock interface includes a clock face with associated hour and minute hands which can be used to display current time and assist in scheduling/retrieving the items of interest. According to another embodiment an attribute of the clock face, such as width, coloring, and highlighting, represents a time duration of the item in time. In yet another embodiment, an attribute of the item, such as width, coloring, or highlighting, represents a time duration of the item in time. In still another embodiment, the catalog of items are predetermined objects of interest such as news, sports, or commentary, selected by a user of the programming guide.

According to another embodiment, the design of the item selection feature automatically invokes secondary programming functions for a particular item of interest when selected. In yet another embodiment, the item selection feature, includes a touch screen technology. In still another embodiment, the item selection feature includes a moving cursor.

According to another embodiment, the item selection feature comprises a penbased technology. In yet another embodiment, the item selection feature comprises a touchball technology. In still another embodiment, the item selection feature comprises a "mouse" technology.

According to another embodiment, selection of an item in the window display will display a corresponding event time designating the item, on the virtual analog clock interface and on the window display, and each item may be scrolled to reveal all sub items within a category. In yet another embodiment, the display interface medium incorporates the selection of the item by selecting the item in the catalog and "dragging" it to the virtual analog clock interface, 'dropping' the item at a desired time interval on the clock interface, displaying the, event time on the display interface medium, adjusting the event time by the "drag/drop" technique, and "poking" at a selected item to reveal its event time and any associated programming highlights. In still another embodiment, adjusting the event time includes the "drag/drop" technique using the catalog item displayed on the virtual analog clock interface.

According to another embodiment, adjusting the event time includes the "drag/drop" technique using the hour and minute hands displayed on the virtual analog clock interface. In yet another embodiment, the video display includes a plurality of disposed virtual analog clock displays interposed with the item selection feature thus facilitating multiple screen display interactions. In still another embodiment, the plurality of virtual analog clock displays includes a 3D screen layout, allowing the user to browse in time among different items. According to an additional embodiment, the item in the catalog is "double tapped" thus accessing a different associated function such as recording.

In further conclusion, the present invention is a video display that includes a touch screen technology incorporating an electronic programming guide for scheduling items of interest. The video display includes an electronic programming guide having a virtual analog clock display with hour and minute hands which renders current time, and the items of interest scheduled time. The video display further includes a catalog of items of interest dependent on a user of the programming guide. The video display still further includes a display interface medium that facilitates the touch screen display technology, comprising both "drag and drop" and "poke" techniques for manipulating the objects of the video display. According to one embodiment 'double tapping' on an item of interest will reveal secondary programming features such as recording. In yet another embodiment, a plurality of virtual analog clock displays are disposed simultaneously, creating a 3D screen effect, thus allowing viewable time progressive and split screen scheduling.

In still further conclusion, the present invention is a method of forming an event scheduling guide for scheduling and retrieving items on a video display. The method includes the steps of providing a virtual analog clock interface disposed on the video display, providing touch screen display technology to manipulate the items on the video display, displaying the items in a catalog of items of interest selective to a user of the event scheduling guide, and facilitating the touch screen display technology by a display interface medium that includes "drag/drop" and "poke" techniques for screen manipulations. According to one embodiment, the method includes the step of incorporating a 'double tapping' technique to access secondary programming functions for a particular item of interest. According to another embodiment, the method further includes the step of providing simultaneous viewing of a plurality of virtual analog clock interfaces in a 3D effect thus allowing time progressive and split screen scheduling.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An event programming guide for scheduling and retrieving items on a video display including a virtual analog clock interface disposed on the video display, and using an item selection feature, comprising:

a virtual analog clock interface disposed on the video display, said virtual clock interface having a face operable to visually represent a plurality of times, said virtual analog clock interface operable to display a point in time via hour and minute hands visually rendered on said face;

a window display disposed on the video display and interposed with the virtual analog clock interface, comprising a catalog of the items for scheduling and retrieving, wherein the items have predefined durations and are selectable via touch of the video display; and a display interface medium that facilitates activation of the item selection feature, comprising both "drag/drop" and "poke" techniques for manipulating the items on the video display, wherein said display interface medium is adapted to initially schedule a selected item according to a specific time interval when the selected item is dragged into a position corresponding to a specific time represented on a face of said virtual analog clock interface, wherein the specific time interval is based on the specific time and a predefined duration of the selected event item;

wherein said point in time corresponds to a start time relating to said specific time interval.

2. The event programming guide according to claim 1, wherein said clock face can be used to display current time and assist in scheduling and retrieving items of interest.

3. The event programming guide according to claim 1, wherein an attribute of the face, including at least one of width, coloring, and highlighting, represents a time duration of the item in time.

4. The event programming guide according to claim 1, wherein an attribute of an item, including at least one of width, coloring and highlighting, represents a time duration of the item in time.

5. The event programming guide according to claim 1, wherein the catalog of items are predetermined objects of interest including at least one of news, sports, and commentary, selected by a user of the programming guide.

6. The event programming guide according to claim 1, wherein a design of the item selection feature automatically invokes secondary programming functions for a particular item of interest when selected.

7. The event programming guide according to claim 1, wherein the item selection feature comprises a touch screen technology.

8. The event programming guide according to claim 1, wherein the item selection feature comprises a moving cursor.

9. The event programming guide according to claim 1, wherein the item selection feature comprises a pen-based technology.

10. The event programming guide according to claim 1, wherein the item selection feature comprises a touch-ball technology.

11. The event programming guide according to claim 1, wherein the item selection feature comprises a "mouse" technology.

12. The event programming guide according to claim 1, wherein selection of an item in the window display will display a corresponding event time designating the item, on the virtual analog clock interface and on the window display, and each item may be scrolled to reveal all sub items within a category.

13. The event programming guide according to claim 1, wherein the display interface medium incorporates the selection of the item by selecting the item in the catalog and "dragging" it to the virtual analog clock interface, 'dropping' the item at a desired time interval on the clock interface, displaying the event time on the display interface medium, adjusting the event time by the "drag/drop" technique, and "poking" at a selected item to reveal its event time and any associated programming highlights.

14. The event programming guide according to claim 13, wherein adjusting the event time includes the "drag/drop" technique using the catalog item displayed on the virtual analog clock interface.

15. The event programming guide according to claim 13, wherein adjusting the event time includes the "drag/drop" technique using the hour and minute hands displayed on the virtual analog clock interface.

16. The event programming guide according to claim 13, wherein the video display includes a plurality of disposed virtual analog clock displays interposed with the item selection feature thus facilitating multiple screen display interactions.

17. The event programming guide according to claim 13, wherein the plurality of virtual analog clock displays includes a 3D screen layout, allowing the user to browse in time among different items.

18. The event programming guide according to claim 17, wherein the item in the catalog is "double tapped" thus accessing at least one associated function including a recording function.

19. A video display that includes a touch screen technology incorporating an electronic programming guide for scheduling items of interest, the electronic programming guide comprising:

a virtual analog clock display with hour and minute hands visually rendering at least one of a current time and scheduled times of the items of interest, said virtual clock display having a face operable to visually represent a plurality of times, said virtual analog clock display operable to display a point in time via said hour and minute hands as visually rendered on said face;

a catalog of the items of interest, wherein the items have predefined start times and predefined durations and are selectable via touch of the video display; and a display interface medium that facilitates the touch screen display technology, comprising both "drag and drop" and "poke" techniques for manipulating the objects of the video display, wherein said display interface medium is adapted to initially schedule a selected item according to a specific time interval when the selected event item is initially selected, wherein the specific time interval is based on a predefined start time and a predefined duration of the selected item;

wherein said point in time corresponds to said predefined start time.

20. The video display according to claim 19, wherein 'double tapping' on an item of interest reveals a plurality of secondary programming features including a recording feature.

21. The video display according to claim 19, wherein a plurality of virtual analog clock displays are disposed simultaneously, creating a 3D screen effect, thus allowing viewable time progressive and split screen scheduling.

22. A method of forming an event scheduling guide for scheduling and retrieving items on a video display, the method comprising the steps of:

providing a virtual analog clock interface disposed on the video display, said virtual analog clock interface operable to display a point in time via hour and minute hands visually rendered on the face of said virtual analog clock interface;

providing touch screen display technology to manipulate the items on the video display;

displaying the items in a catalog of items of interest selective to a user of the event scheduling guide; and facilitating the touch screen display technology by a display interface medium that includes "drag/drop" and "poke" techniques for screen manipulations, and is adapted to initially schedule a selected item of interest using the "drag drop" and "poke" techniques;

wherein said point in time corresponds to a start time relating to a specific time interval associated with a scheduled event item whenever said selected item of interest is selected, in said facilitating, for scheduling as said scheduled event item.

23. The method of claim 22, wherein the method further comprises the step of incorporating a 'double tapping' technique to access secondary programming functions for a particular item of interest.

24. The method of claim 22, wherein the method further comprises the step of providing simultaneous viewing of a plurality of virtual analog clock interfaces in a 3D effect thus allowing time progressive and split screen scheduling.

25. An event programming guide for use with a computerized device having a visual display with touch screen capability, comprising:

a catalog of event items displayed on the visual display, wherein the event items have predefined durations and are selectable via touch of the visual display;

a virtual analog clock interface displayed on the visual display and having a face operable to visually represent a plurality of times, said virtual analog clock interface operable to display a point in time via hour and minute hands visually rendered on said face, said point in time corresponding to a specific time relating to a specific time interval associated with a scheduled event item whenever the scheduled event item is selected from said catalog; and a display interface medium adapted to initially schedule a selected event item according to a specific time interval when the selected event item is dragged into a position corresponding to a specific time represented on the face of said virtual analog clock display;

wherein said specific time interval is based on said specific time and a predefined duration of said selected event item.

26. The event programming guide of claim 25, wherein said display interface medium is adapted to reschedule the selected event item according to a new specific time interval when the selected event item is dragged into a position corresponding to a new specific time on the face of said virtual analog clock display, wherein the new specific, time interval is based on the new specific time and the predefined duration of the selected event item.

27. The event programming guide of claim 26, wherein the point in time corresponds to a current time.

28. An event programming guide for use with a computerized device having a visual display with touch screen capability, comprising:

a catalog of event items displayed on the visual display, wherein the event items have predefined start times and predefined durations and are selectable via touch of the visual display;

a virtual analog clock interface displayed on the visual display and having a face operable to visually represent a plurality of times, said virtual analog clock interface operable to display a point in time via hour and minute hands visually rendered on said face, wherein said point in time corresponds to a start time relating to a specific time interval associated with a scheduled event item whenever the scheduled event item is selected from said catalog; and a display interface medium adapted to initially schedule a selected event item according to a specific time interval when the selected event item is initially selected, wherein the specific time interval is based on a start time and a predefined duration of the selected event item, and wherein said display interface medium is adapted to automatically visually associate a scheduled event item with a portion of said virtual analog clock interface, wherein the portion visually represents at least part of a specific time interval of the scheduled event item.

29. The event programming guide of claim 28, wherein the hour and minute hands are selectable via touch of the visual display, wherein said display interface medium is adapted to reschedule the selected event item according to a new specific time interval when the hour and minute hands are selected and dragged into a position corresponding to a new start time on the face of said virtual analog clock display, and wherein the new specific time interval is based on the new start time and the predefined duration of the selected event item.

30. The event programming guide of claim 28, wherein the hour and minute hands are operable to display a current time.

31. The event programming guide of claim 28, wherein said display interface medium is adapted to retrieve a scheduled event item when the hour and minute hands move into a position corresponding to a specific time interval associated with the scheduled event item.

* * * * *